R. P. Whelan.
Bridle-Bit.
Nº 72950          Patented Dec. 31, 1867.
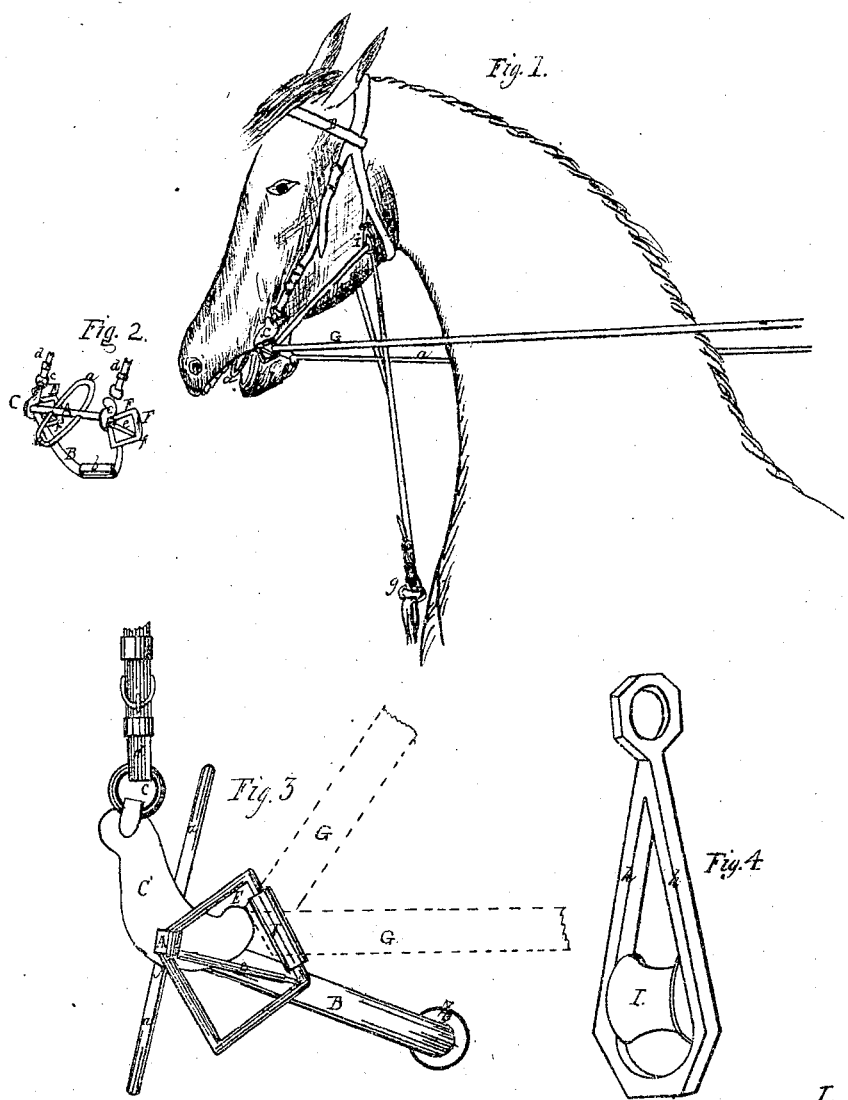
Witnesses:
Inventor:

United States Patent Office.

RICHARD P. WHELAN, OF LEAVENWORTH, KANSAS.

Letters Patent No. 72,950, dated December 31, 1867.

IMPROVEMENT IN BRIDLE-BITS.

The Schedule referred to in these Letters Patent and making part of the same.

TO ALL WHOM IT MAY CONCERN:

Be it known that I, RICHARD P. WHELAN, of the city and county of Leavenworth, in the State of Kansas, have invented certain new and useful Improvements in Bridle-Bits, and the mode of reining and managing horses; and the following is a full, clear, and exact description of the same, reference being had to the accompanying drawings, making a part of this specification, in which—

Figure 1 represents my improved bridle-bit in the horse's mouth, and the mode of attaching the reins for managing the horse.

Figure 2 shows a perspective view of the bridle-bit and headstall strap broken off.

Figure 3 shows an enlarged view of one side of the bit, with the mode of connecting the rein (in red lines.)

Figure 4 shows an enlarged view of one of the pulleys for connecting the rein with the martingale, or substitute, with the throat-latch and headstall.

The object of my invention is to control and manage headstrong horses in the most easy, simple, and perfect manner.

My invention consists in the construction of the bridle-bit, and the mode of applying the reins, so as easily to control the most headstrong or vicious horse without hampering, so as to injure the animal in any manner; the effect being produced by a leverage sufficient to overcome the strength of the animal; and it being nearly self-operating, enables a feeble person to control and manage the most strong and spirited horses.

To enable others to make and use my invention, I will describe it more fully, referring to the drawings and to the letters marked thereon.

The bridle-bit may be made of malleable cast iron, or it may be wrought with swages into form, which consists of the straight bar A, having in its central portion two rings or bows, a a, secured to the bar, so that they lie easy upon the horse's tongue when there is no strain on the reins of the bridle. At about a right angle from the bows a a, a sufficient distance to come outside of the under jaw, is a strong bow, B, which rests under the under lip of the horse. This bow may be covered with one or more rollers, b, made of India rubber, leather, or any other suitable substance, to prevent friction and wear on the under lip. On the bar A, outside of the bow B, are secured the ornamental side pieces C C, they having rings c c in the upper ends, in which to attach the side straps d d of the headstall D. In the outer ends of the bar A are the diamond-shaped rings E E, which are provided with a brace and friction-roller, e e, across the angle f f, and also friction-rollers F F on the upper rear angle, for the reins G G to draw around as they are brought back by the sides of the horse's neck to be controlled by the rider or driver. On each side, and secured to the throat-latch H, are loops of metal, h h, in which are curved pulleys or friction-rollers I I. The reins G G being connected by the snaffle-hook g to the girt or surcingle which passes around the body of the horse, the connection being in the position of the ordinary martingales; the reins then parting, are held in proximity to each other by my peculiarly-constructed buckle, i, (which my intention is, subsequently, to apply for Letters Patent.) The reins then pass up over the pulleys I I, from thence to the diamond-shaped rings E E on the ends of the bar A, passing over the friction-rollers F F, from thence to the check-hook, or the hand of the rider or driver.

Having thus described my improved bridle-bit, and mode of attaching the reins for the managing of horses, I will also describe its operation and advantages: The bridle-bit A and bows a a, when in their proper position, are perfectly easy to the mouth of the horse, lying flat upon the tongue. The bow B, which encircles the under jaw of the animal, keeps the bits square in the mouth, so that they cannot be drawn out on one side, so that the force applied to either rein, to turn or guide the animal, will all take effect, the arrangement of the reins, and their connection with the headstall and diamond-shaped rings E E, being such that the leverage on the bit-bar A will place the bows a a in such a position in the horse's mouth that he cannot close it, thus forming a most efficient gag, so long as he persists in his headstrong course.

The advantages of bridle-bits constructed as above described, and the manner of connecting the reins are, that you entirely dispense with the use of long side shanks for curb-reins, also the curb-reins and martingales, thereby using less quantity of leather, less friction, and less wear on the reins, and a greater leverage on the bits. There are various modifications, which all tend to the same principle, and different places in which the reins may have their fastenings, but none of them more efficient than the method above described, which enables any one to manage a headstrong horse with perfect safety and success.

What I claim as my invention, and desire to secure by Letters Patent, is—

1. The straight bar A, having rings or bows, *a a*, the curved under bar or bow B, with one or more rollers, *b*, as constructed, with ornamental scroll side pieces C C, diamond-shaped rings E E, friction-rollers *e e*, when combined with single reins G G, arranged and operating substantially in the manner herein described for the purposes specified.

2. I claim the combination of the single pair of reins G G with the loops *h h*, pulleys I I, rings E E, rollers F F, and snaffle-hook *g*, when connected and arranged in the manner as and for the purposes herein set forth.

In testimony whereof, I hereunto subscribe my name, in the presence of—

RICHARD P. WHELAN.

Witnesses:
    D. P. COURTNEY,
    AMOS LANDEN.